United States Patent [19]

Takahashi

[11] Patent Number: 4,940,680

[45] Date of Patent: Jul. 10, 1990

[54] SILICON NITRIDE SINTERED MEMBERS

[75] Inventor: Tomonori Takahashi, Chita, Japan

[73] Assignee: NGK Insulators, Ltd., Japan

[21] Appl. No.: 247,373

[22] Filed: Sep. 21, 1988

[30] Foreign Application Priority Data

Sep. 29, 1987 [JP] Japan .................................. 62-242576

[51] Int. Cl.$^5$ ............................................. C04B 35/58
[52] U.S. Cl. ......................................... 501/97; 501/98
[58] Field of Search ..................................... 501/97, 98

[56] References Cited

U.S. PATENT DOCUMENTS

| 4,280,850 | 7/1981 | Smith et al. | 501/97 |
| 4,383,958 | 5/1983 | Moschetti et al. | 264/65 |
| 4,406,667 | 9/1983 | Savin et al. | 51/295 |
| 4,670,024 | 6/1987 | Bhat et al. | 51/295 |
| 4,699,890 | 10/1987 | Matsui | 501/98 |

FOREIGN PATENT DOCUMENTS

| 2344512 | 10/1977 | France . | |
| 59-39774 | 3/1984 | Japan | 501/97 |

Primary Examiner—William R. Dixon, Jr.
Assistant Examiner—Sue Hollenbeck
Attorney, Agent, or Firm—Arnold, White & Durkee

[57] ABSTRACT

A silicon nitride sintered member including a silicon nitride sintered body and a dense silicon nitride coating layer covering the surface of the silicon nitride sintered body. An intergranular phase of the silicon nitride sintered body is substantially composed of crystals.

6 Claims, No Drawings

SILICON NITRIDE SINTERED MEMBERS

BACKGROUND OF THE INVENTION (1) Field of the Invention:

The present invention relates to high strength silicon nitride sintered members. More particularly, the invention relates to silicon nitride sintered members which have excellent oxidation resistance and which can be used as high temperature structural members.

(2) Related Art Statement:

Since silicon nitride sintered bodies have high strength at high temperatures and excellent thermal shock resistance, they are used as gas turbine members or high temperature structural members while their fired surfaces or worked surfaces are exposed. When the silicon nitride sintered bodies which constitute such members by fired surfaces or worked surfaces thereof are used at high temperatures, the strength of the members lowers due to oxidation of the surface of the bodies. Thus, their use life is conspicuously limited when they are used as gas turbine members or high temperature structural members. In view of this, for example, Japanese patent publication No. 61-40,630 or Japanese patent application Laid-open No. 60-161,383 discloses improvement of oxidation resistance of silicon nitride sintered bodies by covering their surfaces with a silicon nitride coating layer of excellent oxidation resistance through a CVD process (chemical vapor disposition process).

However, when even such silicon nitride sintered bodies covered with the silicon nitride by the CVD process are used at high temperatures, there is a problem in that the silicon nitride coating layer reacts with an intergranular phase of the silicon nitride sintered body to cause peeling or breakage of the coating layer so that an oxidation resistance-imparting effect of the coating layer diminishes.

SUMMARY OF THE INVENTION

It is an object of the present invention to eliminate the above problems, and to provide silicon nitride sintered members having excellent oxidation resistance and high strength.

The silicon nitride sintered member according to the present invention is characterized in that the silicon nitride sintered member comprises a silicon nitride sintered body, that the intergranular phase of the silicon nitride sintered body is substantially composed of crystals, and that the surface of the silicon nitride sintered body is coated with a dense silicon nitride layer.

In the above construction, a silicon nitride sintered member having improved oxidation resistance is obtained by covering the surface of the silicon nitride sintered body having the intergranular phase composed substantially of crystals with the dense crystalline silicon nitride. Further, the CVD process is preferred, because such a dense crystalline silicon nitride having excellent properties can be obtained by forming the silicon nitride coating layer on the surface of the silicon nitride sintered body by the CVD process.

The term "dense" means that the silicon nitride is gas-tight, and has a porosity of not more than 1%. Therefore, the dense silicon nitride coating layer is made of gas-tight silicon nitride having a porosity of not more than 1%. The "dense" or "gas-tight" means that pores present in the surface of the coating layer do not reach the silicon nitride sintered body. The reason why the porosity is limited to not more than 1% is that when the porosity of the coating layer is not more than 1%, the above pores reaching the surface of the sintered body do not exist, and substantially gas tightness of the layer can be obtained.

These and other objects, features and advantages of the invention will be appreciated upon reading of the invention when considered in conjunction with the attached drawings, with the understanding that some modifications, variations, and changes of the same could be made by the skilled person in the art to which the invention pertains without departing from the spirit of the invention or the scope of claims appended hereto.

DETAILED DESCRIPTION OF THE INVENTION

The silicon nitride sintered body according to the present invention is composed of a silicon nitride raw material and one or more of various additives, and the intergranular phase is crystallized by sintering pressurelessly or under pressure, or sintering through hot press, HIP or the like, and further by heating at need. Thereby, the intergranular phase is substantially composed of crystals. That the intergranular phase is substantially composed of crystals means that when the silicon nitride sintered body is observed by a transmission type electron microscope or the like, not less than a half of the intergranular phase is composed of crystals. In general, the surface of the silicon nitride sintered body to be covered with silicon nitride may be either one of a fired surface or a worked surface. Silicon nitride sintered bodies having the intergranular phase crystallized are disclosed in, for instance, Japanese patent application Laid-open No. 61-68,373 and 55-3,397. The present invention is characterized in that the intergranular phase is not a glass phase, but substantially composed of crystals. The crystalline phase may be H, J, and/or N-D phase, but is not necessarily limited thereto.

The silicon nitride coating layer formed is a dense $\alpha$- or $\beta$-crystalline material. The thickness of the silicon nitride coating layer is preferably not less than 10 $\mu$m and not more than 1 mm. The thickness is more preferably not less than 50 $\mu$m and not more than 300 $\mu$m. The reason why the thickness of the silicon nitride coating layer is limited is that if the thickness is less than 10 $\mu$m, sufficient oxidation resistance is not given to the entire surface due to pores and defects. On the other hand, if the thickness is more than 1 mm, the coated layer is likely to peel or break. When the thickness of the silicon nitride coating layer is in a range of not less than 50 $\mu$m and not more than 300 $\mu$m, the above effects can more favorably be exhibited. As a process for forming the silicon nitride coating layer, the CVD process is preferred, which deposits silicon nitride on the surface of the sintered body through reacting raw gases such as $SiCl_4$ and $NH_3$ at 1,200° to 1,500° C., thereby forming a coating layer thereon. The intergranular phase is crystallized mainly depending upon the composition of an additive or additives. If the crystallization is insufficient, the sintered body is heated again after cooling.

Examples of the present invention will be given in the followings.

An additive or additives given in the following Table 1 were added to a silicon nitride raw material, which was shaped and sintered at 1,700° to 1,900° C, thereby obtaining a silicon nitride sintered body having an intergranular phase shown in Table 1 and a rectangular plate like shape of 5 mm×15 mm×30 mm.

Silicon nitride sintered member Nos. 1–4 according to the present invention were obtained by covering the entire surface of the sintered body Nos. 1 to 4 each having the intergranular phase composed of a crystalline phase with a dense silicon nitride coating layer in a thickness given in Table 1 through feeding $SiCl_4$ and $NH_3$ as raw gases in flow rates of 20 ml/min and 60 ml/min, respectively, for 60 minutes into a CVD reactor furnace heated at 1,400° C. together with 400 ml/min of an $H_2$ carrier gas, while the pressure inside the furnace was maintained at 70 m bar. As in the same manner as in the silicon nitride sintered body Nos. 1 to 4, the entire surface of each of the silicon nitride sintered body Nos. 5 to 8 having the intergranular phase composed of a glass phase was covered with a dense silicon nitride coating layer in a thickness shown in Table 1, thereby obtaining silicon nitride sintered member Nos. 5 to 8 as comparative examples.

After the silicon nitride sintered member Nos. 1 to 8 were heated at 1,300° C. in air for 100 hours, weight increase per unit surface area due to oxidation and the state of the silicon nitride coating layers after the oxidation were checked. Results are shown in Table 1.

TABLE 1

| No. | | Additive(s) | Intergranular phase in sintered body | Thickness of silicon nitride coating layer (μm) | Weight increase due to oxidation (mg/cm$^2$) | State of coating layer after oxidation |
| --- | --- | --- | --- | --- | --- | --- |
| Present invention | 1 | $Y_2O_3$ | H phase | 99 | <0.1 | no change |
| | 2 | " | " | 80 | <0.1 | " |
| | 3 | $Y_2O_3$, MgO, $ZrO_2$ | J phase | 88 | <0.1 | " |
| | 4 | " | N-D phase | 119 | <0.1 | " |
| Comparative Example | 5 | SrO, MgO, $CeO_2$ | Glass phase | 62 | — | coating layer peeled |
| | 6 | " | " | 98 | 5.0 | coating layer cracked |
| | 7 | $Y_2O_3$, $Al_2O_3$ | " | 77 | 4.5 | coating layer cracked |
| | 8 | " | " | 103 | 4.2 | coating layer cracked |

As is clear from Table 1, the silicon nitride sintered members according to the present invention in which the intergranular phase was substantially composed of crystals exhibited excellent oxidation resistance in that almost no changes occurred in the silicon nitride coating layer formed by the CVD process, and that the oxidation weight increase was not more than 0.1 mg/cm$^2$. On the other hand, in the silicon nitride sintered members as comparative examples in which the intergranular phase was the glass phase, the intergranular phase of the silicon nitride sintered body reacted with the silicon nitride coating layer, so that the coating layer was peeled or cracked, and that the oxidation weight increase was great.

As mentioned above, the silicon nitride sintered member according to the present invention is characterized in that the intergranular phase is substantially composed of crystals and that the sintered member is produced by covering the sintered body with silicon nitride. Thus, the silicon nitride sintered member according to the present invention has excellent mechanical properties attributed to silicon nitride and excellent oxidation resistance, and are applicable to gas turbine engine parts and high temperature structural materials.

What is claimed is:

1. A silicon nitride sintered member consisting essentially of a silicon nitride sintered body and a dense silicon nitride coating layer covering a surface of the silicon nitride sintered body, wherein an intergranular phase of the silicon nitride sintered body is substantially crystalline and said silicon nitride coating layer has a thickness of about 10 μm–1 mm.

2. A silicon nitride sintered member according to claim 1, wherein the silicon nitride coating layer is formed by a CVD process.

3. A silicon nitride sintered member according to claim 1, wherein a thickness of the silicon nitride coating layer is in a range from 50 μm to 300 μm.

4. A silicon nitride sintered member according to claim 1, wherein said dense silicon nitride coating layer consists of crystallized α- or β- silicon nitride.

5. A silicon nitride sintered body according to claim 1, wherein said crystalline intergranular phase comprises at least one phase selected from the group of silicon nitride phases consisting of H, J, and N-D.

6. A silicon nitride sintered member consisting essentially of a silicon nitride sintered body and a dense silicon nitride coating layer covering a surface of the silicon nitride sintered body, wherein an intergranular phase of the silicon nitride sintered body is substantially crystalline and said silicon nitride coating layer has a thickness of about 10 μm –1 mm and a porosity of not greater than 1%.

* * * * *